United States Patent
Maiullo

(10) Patent No.: US 10,221,917 B2
(45) Date of Patent: Mar. 5, 2019

(54) VARIABLE MOMENT FLYWHEEL

(71) Applicant: Daniel Anthony Maiullo, Creston, NC (US)

(72) Inventor: Daniel Anthony Maiullo, Creston, NC (US)

(*) Notice: Subject to any disclaimer, the term of this patent is extended or adjusted under 35 U.S.C. 154(b) by 4 days.

(21) Appl. No.: 15/062,930

(22) Filed: Mar. 7, 2016

(65) Prior Publication Data

US 2016/0265621 A1 Sep. 15, 2016

Related U.S. Application Data

(60) Provisional application No. 62/133,440, filed on Mar. 15, 2015.

(51) Int. Cl.
*F16F 15/31* (2006.01)

(52) U.S. Cl.
CPC ............. *F16F 15/31* (2013.01); *Y02E 60/16* (2013.01)

(58) Field of Classification Search
CPC .......... F16F 15/31; F16F 15/16; F16F 15/161; F16F 15/162; F16F 15/173; F16F 15/13157; F16F 13/26; F16F 13/268; F16F 13/266; F16F 13/264; F16F 13/262; F16F 15/366; Y10T 74/2122; Y10T 74/2119; Y10T 74/2117; Y10T 74/2132; Y10T 74/2115; Y10T 74/2114; Y10T 74/2112; Y10T 74/2111; Y10T 74/211; Y10T 74/2109; Y10T 74/2116; G01M 1/365; B04B 9/14; B04B 5/0421
See application file for complete search history.

(56) References Cited

U.S. PATENT DOCUMENTS

| | | | | |
|---|---|---|---|---|
| 1,254,694 A | * | 1/1918 | Humphries | F16F 15/363 74/570.2 |
| 2,341,695 A | * | 2/1944 | Critchfield | F16F 15/31 74/573.1 |
| 2,403,478 A | * | 7/1946 | Burnat | F16F 15/31 74/573.11 |
| 3,970,409 A | * | 7/1976 | Luchuk | F03D 7/06 415/4.3 |
| 4,892,174 A | * | 1/1990 | Takekado | F16F 15/16 188/268 |

(Continued)

FOREIGN PATENT DOCUMENTS

| | | | | |
|---|---|---|---|---|
| FR | 639057 A | * | 6/1928 | F16F 15/31 |
| FR | 2431788 A1 | * | 2/1980 | F03G 6/001 |

(Continued)

*Primary Examiner* — Daniel D Yabut

(57) ABSTRACT

A method for storage of excess energy which would otherwise be lost, the regulation of angular velocity, and prevention of excessive velocities is disclosed. The device consists of a bowl shaped container, divided into sections by radially oriented vertical walls, which holds a fluid (any appropriate liquid or set of small solid particles), and spins on its vertically oriented axis at various angular velocities. The floor of the device is formed in successive shapes of bowls and shelves, which allows for a kind of "gearing". The invention allows more and more energy to be input into the device while the angular velocity is regulated within a particular range. A typical embodiment of the invention would include its attachment by a shaft at the axis to a vertical axis wind turbine.

2 Claims, 3 Drawing Sheets

Key:
1  Wind turbine
2  Central shaft
3  3rd bowl
4  2nd shelf
5  2nd bowl
6  1st shelf
7  1st bowl
8  Cross section of device
9  Support pole for wind turbine
10 Outer edge of shelf/Inner rim of bowl
11 Hub
12 Top edge of device
13 Empty interior space

(56) References Cited

U.S. PATENT DOCUMENTS

| | | | |
|---|---|---|---|
| 6,984,899 B1 * | 1/2006 | Rice | F03D 3/049 |
| | | | 290/44 |
| 9,115,782 B2 * | 8/2015 | Yoshinari | D06F 37/245 |
| 2004/0003678 A1 * | 1/2004 | Neubauer | F16F 15/363 |
| | | | 74/570.2 |
| 2007/0225143 A1 * | 9/2007 | Kim | B04B 5/0421 |
| | | | 494/82 |
| 2010/0009835 A1 * | 1/2010 | Ryu | B04B 9/14 |
| | | | 494/82 |

FOREIGN PATENT DOCUMENTS

| | | | | | |
|---|---|---|---|---|---|
| JP | 57183578 A | * | 11/1982 | | F16F 15/31 |
| JP | 59001838 A | * | 1/1984 | | F16F 15/31 |
| JP | 59026642 A | * | 2/1984 | | F16F 15/31 |

* cited by examiner

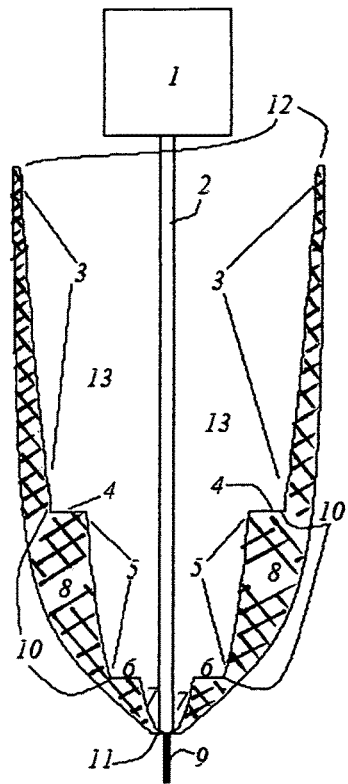

Key:
| | |
|---|---|
| 1 | Wind turbine |
| 2 | Central shaft |
| 3 | 3rd bowl |
| 4 | 2nd shelf |
| 5 | 2nd bowl |
| 6 | 1st shelf |
| 7 | 1st bowl |
| 8 | Cross section of device |
| 9 | Support pole for wind turbine |
| 10 | Outer edge of shelf/Inner rim of bowl |
| 11 | Hub |
| 12 | Top edge of device |
| 13 | Empty interior space |

Fig. 2

Device shape as defined by the function:

$$h(r) = \begin{bmatrix} .04 \leq r \leq .072, & 15927 \cdot (r^4 - .08r^3 + .0016r^2) & \textit{first bowl} \\ .072 < r \leq .11, & .0001 \cdot \sqrt{r} + h(.072) & \textit{first shelf} \\ .11 < r \leq .14, & 2548.42 \cdot (r^4 - .11527r^3 + .003322r^2) + h(.11) & \textit{2nd bowl} \\ .14 < r \leq .182, & .001 \cdot \sqrt{r} + h(.14) & \textit{2nd shelf} \\ .192 < r \leq .222 & 637.105 \cdot (r^4 - .11058r^3 + .003057r^2) + h(.182) & \textit{3rd bowl} \end{bmatrix}$$

Fig. 3

Top down view of device

VARIABLE MOMENT FLYWHEEL

CROSS-REFERENCE TO RELATED APPLICATIONS

Provisional Application 62/133,440 Mar. 15, 2015

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

Not applicable.

TECHNICAL FIELD

The present invention relates generally to a method and a flywheel apparatus for absorbing and storing excess fluctuating energy and power by varying the moment of inertia of the flywheel.

BACKGROUND

All devices designed to convert the kinetic energy of wind into mechanical and/or electrical energy, commonly called "wind turbines", need to contend with the fluctuating nature of the wind. All existing wind turbine devices have to contend with the impact of varying angular velocity on the voltage of the electricity produced. Various accommodations have been conceived to deal with the effects of these variations. These innovations include: variable speed electrical generating systems, blade pitch angle control, overspeed electronic breaking protection, diversion load resistors, mechanical disk brakes, electronic angular velocity moderation keyed to wind speed, anemometers to measure wind speed, and various, innumerable other control devices. With all of these devices, the excess power of the wind is lost and is not used to generate electrical or mechanical energy.

A fixed speed wind turbine generator system must be very mechanically robust, adding to cost. Because the rotor speed cannot be varied, fluctuations in wind speed translate directly into drive train torque fluctuations, causing higher structural loads than with variable speed systems.

A variable speed wind turbine generator system is necessarily more complicated than the fixed speed systems. The variable speed system incorporates a doubly fed induction generator, a wound field synchronous generator, or a permanent magnet synchronous generator. These more complicated designs require electronic power converters which reduce electrical efficiency and add to costs.

Additionally, "lift type" vertical axis wind turbines ("VAWT") have to contend with the problem of stall caused by rapid change of attack angle which results from excessive angular velocity.

The present invention is designed to convert the excess power of the wind into increased moment of inertia and potential energy, and thereby increased storage of energy, which, when the wind ebbs, is converted into the kinetic energy of the rotor which then generates electric energy. Additional benefits include regulation of angular velocity and prevention of excessive velocities. With the proper specific design, the invention can control the angular velocity within the parameters required by the particular wind turbine and charging system.

The invention, with the proper specific design, can be used with any wind turbine of any size and any orientation. It can be used with a horizontal axis wind turbine by incorporating a worm gear or something comparable to allow for the vertical orientation of the present invention. It can also be used in other applications in which it is useful to smooth the fluctuations of energy input, to store excess energy, and to regulate the angular velocity of any mechanical apparatus.

BRIEF SUMMARY OF THE INVENTION

The device consists of a bowl shaped container which holds a fluid. The container is horizontally oriented and spins on its vertically oriented axis at various angular velocities. The bowl is divided into sections by radially oriented vertical walls. As the container turns, the walls push the fluid around and prevent it from sliding along the essentially frictionless floor of the bowl.

The fluid can be any appropriate liquid or set of small spherical (or non-spherical) solid particles.

The floor of the device is shaped in the radial direction in an increasing angle to the horizontal approaching ninety degrees. This part of the device is called the first bowl. As the angle gets close to ninety degrees, it rapidly drops to a much lower angle. This part of the device is called the first shelf. Then the angle increases, approaching ninety degrees again. This part of the device is called the second bowl. This shape repeats as many times as is required by the specific turbine, charging system, and circumstances for which the invention is designed. This repeating shape of bowls and shelves allows for a kind of "gearing": as excess energy is input into the device, it increases the angular velocity of the turbine, and thereby that of the invention. The mass is therefore pushed up the walls of the bowl in an outward radial direction until it flows over the shelf and into the next bowl. After the mass flows over the shelf, it rapidly flows outward, thereby increasing the moment of inertia of the system. Conservation of angular momentum then demands a reduction of angular velocity of the system. Any subsequent increase in wind velocity can then increase the angular velocity of the system again, thereby pushing the mass further outward and up the walls of the next bowl. This cycle repeats as many times as the system is designed to accommodate.

As the mass moves outward radially and upward, the angular momentum and stored energy of the system increases. When the wind ebbs, the angular velocity decreases, thereby allowing the mass to fall toward the axis of the device, decreasing the moment of inertia and the energy of the system. The decrease in the moment of inertia and conservation of angular momentum requires a subsequent increase in angular velocity. The system therefore responds to gusts and lulls in the wind by respectively absorbing and releasing energy to keep the angular velocity within a particular range determined by the specific design of the turbine and charging system.

BRIEF DESCRIPTION OF THE DRAWINGS

FIG. 2 is a vertical cross-section (8) of the device attached to a wind turbine (1) by the central shaft (2) of the device.

Figure 1:
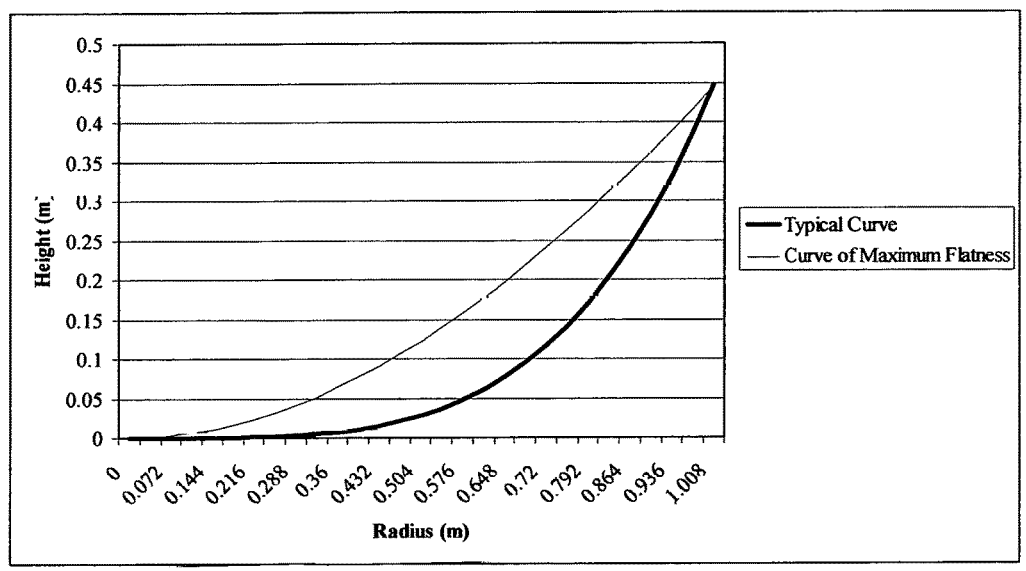
FIG. 1 is a graph showing the height of the bowl of the invention as a function of the radius of the bowl.

The drawing shows the successive bowls and shelves of the device based upon the piece-wise function (FIG. 3) of a possible specific embodiment of the invention set forth under the Detailed Description of the Invention: 1st bowl (7), 1st shelf (6), 2nd bowl (5), 2nd shelf (4), and 3rd bowl (3). The wind turbine and device is supported by a pole (9) which passes through the central shaft (2) of the device. The outer edge of each shelf (10) is joined to the inner rim of each respective, succeeding bowl (10). The hub (11) of the device is the base of the central shaft (2). The top edge of the device (12) is the outer rim of the uppermost bowl (3). The empty interior space (13) is defined by the bowls (3, 5, 7) and shelves (4, 6).

FIG. 3 is the piece-wise function of a possible specific embodiment of the invention set forth under the Detailed Description of the Invention, and determines the shapes of the successive bowls and shelves of the device depicted in FIG. 2 in which the origin of the coordinate system of the function is the horizontal center of bottom of the hub (11).

Figure 4:
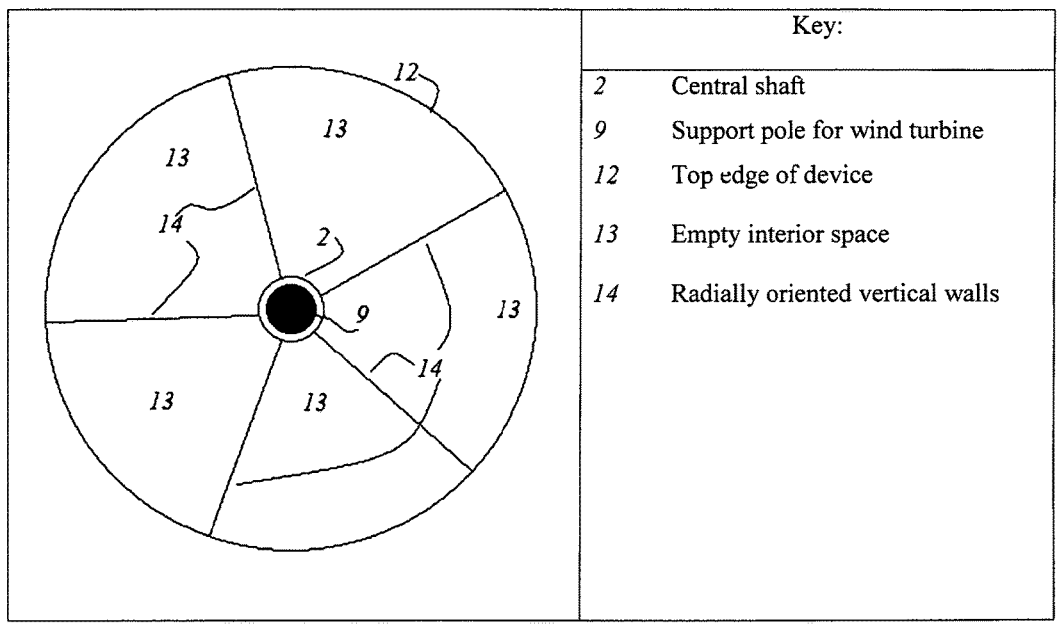

FIG. 4 is a top down view of the device showing the radially oriented vertical walls (14) dividing the empty interior space (13) in relation to the central shaft (2), the supporting pole (9), and the top edge of the device (12).

DETAILED DESCRIPTION OF THE INVENTION

Mathematics. The mathematics of the invention is derived as follows: Picture a bowl-shaped device with inclined sides spinning about its axis. In the device are radially oriented vertical walls. Also in the device is a fluid substance (mass) which moves up and down the sides. The fluid mass can be any appropriate liquid or set of small spherical (or non-spherical) solid particles. As the device spins on its axis, this mass is pushed around by the radially oriented vertical walls. As the angular velocity increases, the mass moves further out radially and up the inclined sides of the device. The total energy of the device is the sum of the potential energy and kinetic energy.

The potential energy, $U=mgh$, where m is the mass, g is the acceleration due to gravity, and h is the height of the mass from the base of the device.

The kinetic energy, $K=\frac{1}{2}\omega^2 r^2 m = \frac{1}{2}\omega^2 I$, where m is the mass; $\omega$ is the angular velocity of the device and, by virtue of the vertical walls in the device, the angular velocity of the mass; r is the distance of the mass from the axis of the bowl; and I is the moment of inertia of the system.

The moment of inertia, $I=r^2 m$. The invention is called a "variable moment flywheel" because the moment of inertia varies with the radius, the distance of the mass from the axis of the bowl.

Moment Of Inertia Dilemma. As $\omega$ increases or decreases, so do r and h, and so do the kinetic and potential energies of the device. But, as $\omega$ increases and r increases, so does the moment of inertia I, which, if the energy is constant, leads to a decrease of the angular velocity $\omega$, thereby leading to a decrease in the radius r of the mass, which leads to a decrease in the moment of inertia I, which decrease would lead to an increase in $\omega$ and r, ad infinitum. This dynamic would lead to a sort of yo-yo effect in which the radius of the mass, the angular velocity, the moment of inertia, and the kinetic and potential energies would increase and decrease constantly, possibly increasing in frequency and violence.

The design of a successful device requires a resolution of the above described dilemma. This dilemma is resolved by constraining the variables $\omega$, r and h (as derived from potential energy) into particular relationships with each other. The specifics of these relationships will be determined by the specific application of the invention. The general forms of the equations are:

Radius as a function of angular velocity: $r(\omega)$
$$=k_1 \omega^{e_1}+C_1$$

Potential energy as a function of kinetic energy:
$$U(K)=k_2 K^{e_2}+C_2$$

Height as a function of radius ($C_2=0$ to simplify the mathematics): $h(r)=k_3 (r(\omega))^{e_3}+C_3$ The typical values for $e_1$, $e_2$, and $e_3$ are 1, 1 and 4, respectively. In the typical case, $$k_3 = \frac{k_2}{2gk_1^2},$$

and, therefore, $h(r)=k_3(r^4-2r^3 C_1+r^2 C_1^2)+C_3$. (typical curve)

The values for the constants are determined by the specifics of the application. It is also possible to frame r as some other kind of function of $\omega$, and U as some other kind of function of K. The function h(r) would then be derived from those two functions. However, the mathematics are often more complicated and the results are not any more useful than the above equations.

Flatness. The importance of defining h(r) is that this function describes the shape of the bowl of the device. One important characteristic of the shape of the bowl, or the curve of the function, is its "flatness". The typical curve is concave up. The flatter the curve, the more unstable will be the position of the mass on the surface of the bowl. (A straight line or concave down curve will be wholly unstable and ineffective.) The limit to how flat the curve can be is determined when a mass can be placed anywhere on the bowl at a certain angular velocity, and the mass will stay put at that angular velocity. A little faster, and the mass will fly up the side. A little slower, and the mass will fall to the bottom. This curve of maximum "flatness" is defined by the following function: $h(r)=r\tan^{-1}(kr)-\frac{1}{2}\ln(1+k^2 r^2)+C$ (curve of maximum flatness).

This function is derived as follows: For an incline, gravitational force is equal to the vertical component of the normal force: $F_g=mg=N\cos\phi$, where m is the mass, g is the acceleration due to gravity, N is the normal force, and $\phi$ is the angle of the incline with the horizontal. Rearranging this equation, we obtain an expression for the normal force:

$$N=\frac{mg}{\cos\phi}.$$

Centripetal force is: $F_c=mr\omega^2$, where r is the distance of the mass from the axis of the device and $\omega$ is the angular velocity of the bowl and the mass. This centripetal force is equal to the horizontal component of the normal force, giving us: $F_c=mr\omega^2=N\sin\phi$.

Substituting $$\frac{mg}{\cos\phi}$$

for the normal force in this equation, we get:

$$mr\omega^2 = \frac{mg}{\cos\varphi}\sin\varphi.$$

Simplifying this equation and solving for φ yields:

$$\phi = \tan^{-1}\left(\frac{r\omega^2}{g}\right).$$

A mass placed on an incline of angle φ at a particular radius r and angular velocity ω according to this equation represents a situation in which the mass will not move up or down the incline.

Since φ represents the slope of the bowl, the integral of this function will represent the shape of the bowl. If we keep ω constant $$\left(\text{say } k = \frac{\omega^2}{g}\right),$$

φ is a function only of r. Then $\phi(r)=\tan^{-1}(kr)$ and the shape of the bowl for a particular angular velocity is described by the following integral: $\int\phi(r)=h(r)=r\tan^{-1}(kr)-\frac{1}{2}\ln(1+k^2r^2)+C$ (Curve of Maximum flatness).

So, a mass placed at any point on a spinning bowl of this shape will not move up or down as long as ω remains at a specific constant value. If ω increases, the mass will move rapidly to the outer edge of the bowl. If ω decreases, the mass will fall rapidly to the center of the bowl. To allow for smoother operation of the invention, the shape of the bowl (the curve of the function) needs to be less "flat", allowing for some stability of the mass on the side of the bowl. This is accomplished by the typical equation and variations of it.

An example of a comparison between these two curves follows: The equation of the typical curve in FIG. 1 is $h(r)=0.433231 \cdot r^4$ ($k_3=0.433231$, $C_1=C_2=C_3=0$), and the equation of the curve of maximum flatness in FIG. 1 is $h(r)=r\tan^{-1}(r)-\frac{1}{2}\ln(1+r^2)$. (k=1, C=0).

Bowls and Shelves and Gearing. The floor of the device is shaped in the radial direction in an increasing angle to the horizontal approaching ninety degrees. This part of the device of increasing angle is called the first bowl. As the angle gets close to ninety degrees, it rapidly drops to a much lower angle. This lower angle part of the device is called the first shelf. Then the angle increases, approaching ninety degrees again. This part of the device of increasing angle is called the second bowl. This shape repeats as many times as is required by the specific turbine, charging system, and circumstances for which the invention is designed.

This repeating shape of bowls and shelves allows for a kind of "gearing": as excess energy increases the angular velocity of the turbine, and thereby that of the device itself, the mass is pushed up the walls of the first bowl in an outward radial direction until it flows onto the first shelf. After the mass flows onto the first shelf, it rapidly flows outward, thereby increasing the moment of inertia of the system. Conservation of angular momentum then demands a reduction of angular velocity of the system. Any subsequent increase in wind energy can then increase the angular velocity again, thereby pushing the mass further outward and up the walls of the second bowl. This cycle repeats as many times as the system is designed to accommodate. Each bowl is designed to operate within certain limits of angular velocity, but each successive bowl operates at higher levels of kinetic energy than the previous bowl due to the increase in the moment of inertia of the device.

As the mass moves outward radially and upward, the angular momentum and stored energy of the system increases. When the wind ebbs, the angular velocity decreases, thereby allowing the mass to fall toward the center of the device, decreasing the moment of inertia and the energy of the system. The decrease of the moment of inertia and conservation of angular momentum requires a subsequent increase in angular velocity. The system therefore responds to gusts and lulls in the wind by respectively absorbing and releasing energy to keep the angular velocity within a particular range determined by the specific design of the turbine and charging system.

The importance of defining h(r) is that this function describes the shapes of the bowls and shelves of the device. These shapes determine the behavior of the invention. The origin of the coordinate system of the function is at the intersection of the axis and the base of the device. At the top edge of the first bowl, another function takes over to create the first shelf of the device. A third function, similar to the original function h(r), takes over at the outer edge of the first shelf to define the shape of the second bowl. This pattern repeats for as many bowls and shelves the system requires, resulting in a piece-wise function. This piece-wise function will typically take the following form:

$$h(r) = \begin{bmatrix} a \leq r \leq b, & k_3 r^4 + C_3 & \text{first bowl} \\ b < r \leq c, & k_4\sqrt{r} + h(b) & \text{first shelf} \\ c < r \leq d, & k_5 r^4 + h(c) & \text{2nd bowl} \\ d \ldots & k_6\sqrt{r} + \ldots & \text{2nd shelf} \end{bmatrix}$$

One Possible Embodiment

The equations for one possible embodiment of the invention involve a one kilogram mass, and a restriction of the angular velocity to less than 800 revolutions per minute (rpm). The mass will be comprised of small spherical pieces of lead or similarly dense material. The center of the first bowl of the device will contain a vertically oriented axle with a diameter of 0.08 meter for attachment to the wind turbine. Radius (r) and height (h) are measured in meters. The function describing the bowls and shelves of the device is:

$$h(r) = \begin{bmatrix} .04 < r < .072, & 15927 \cdot (r^4 - .08r^3 + .0016r^2) & \text{first bowl} \\ .072 < r \leq .11, & .0001 \cdot \sqrt{r} + h(.072) & \text{first shelf} \\ .11 < r \leq .14, & 2548.42 \cdot (r^4 - .11527r^3 + & \text{2nd bowl} \\ & .003322r^2) + h(.11) & \\ .14 < r \leq .182, & .001 \cdot \sqrt{r} + h(.14) & \text{2nd shelf} \\ .192 < r \leq .222, & 637.105 \cdot (r^4 - .11058r^3 + & \text{3rd bowl} \\ & .003057r^2) + h(.182) & \end{bmatrix}$$

The drawing of this embodiment is set forth later in this application in FIG. 2. A sampling of dynamic values associated with this embodiment is set forth in the following table.

| | Radius (m) | Height (m) | Angular velocity (rpm) | Moment of Inertia (kg · m$^2$) | Kinetic Energy (joules) |
|---|---|---|---|---|---|
| First Bowl | .04 | 0 | 0 | .00160 | 0 |
| | .048 | .002349 | 191 | .00230 | 0.461 |
| | .056 | .012787 | 382 | .00314 | 2.51 |
| | .064 | .037578 | 573 | .00410 | 7.37 |
| | .072 | .084550 | 764 | .00518 | 16.6 |
| First Shelf | .080 | .084579 | 688 | .00640 | 16.6 |
| | .088 | .084580 | 625 | .00774 | 16.6 |
| | .096 | .084581 | 573 | .00922 | 16.6 |
| | .104 | .084582 | 529 | .0108 | 16.6 |
| 2nd Bowl | .112 | .094475 | 519 | .0125 | 18.5 |
| | .120 | .142721 | 596 | .0144 | 28.0 |
| | .128 | .206719 | 672 | .0164 | 40.6 |
| | .136 | .289449 | 749 | .0185 | 56.8 |
| 2nd Shelf | .144 | .33922 | 765 | .0207 | 66.5 |
| | .152 | .33923 | 725 | .0231 | 66.5 |
| | .160 | .33924 | 689 | .0256 | 66.5 |
| | .168 | .33925 | 656 | .0282 | 66.5 |
| | .176 | .33926 | 626 | .0310 | 66.5 |
| 3rd Bowl | .184 | .3573 | 615 | .0339 | 70.1 |
| | .192 | .4389 | 653 | .0369 | 86.1 |
| | .200 | .534 | 691 | .0400 | 105 |
| | .208 | .643 | 729 | .0433 | 126 |
| | .216 | .768 | 768 | .0467 | 151 |
| | .222 | .873 | 796 | .0493 | 171 |

One advantage of the invention becomes clear from these figures. Of course, with a fixed momentum flywheel, as angular velocity increases, so does kinetic energy. However, with the present invention, at each shelf angular velocity decreases while kinetic energy remains approximately constant because the moment of inertia simultaneously increases. This allows the device to spin within a particular range of angular velocity while kinetic energy continues to increase in a step-wise manner, similar to the effect of an automatic transmission in a motor vehicle. The resulting benefits include: 1) increased energy storage, 2) regulation of angular velocity, and 3) a method of preventing excessive angular velocity and the consequential "stall" of lift type vertical axis wind turbines.

The invention claimed is:

1. A flywheel device (8) a moment of inertia of which is varied by automatically redistributing a fluid, said fluid being a liquid, set of small spherical, or non-spherical solid particles, within the flywheel according to changes in angular velocity of the flywheel by means of
   a plurality of alternating and concentric bowls (3, 5, 7) and shelves (4, 6),
   an empty interior space (13) defined by the bowls and shelves divided by radially oriented vertical walls (14),
   the bowls shaped concave up to allow the said fluid to climb the bowl due to increasing said angular velocity and to fall down the bowl due to decreasing said angular velocity, and
   the shelves shaped concave down to allow the fluid to flow to an outer edge of the shelf thereby decreasing said angular velocity and to flow to the inner parts of the shelf thereby increasing said angular velocity.

2. The flywheel device according to claim 1 in which the concavity of the bowls is greater than that determined by a function $h(r)=r\ \tan^{-1}(kr)-\frac{1}{2}\ \ln(1+k^2r^2)+C$, where h is a vertical distance from a surface of the bowl to an inner rim of the bowl (10) or to a hub (11) if a first bowl, r is the radial distance, k is a constant equal to 1, and C is a constant equal to zero.

* * * * *